(Model.)
2 Sheets—Sheet 1.
J. C. SMITH.
MICROMETER GAGE.
No. 495,379.
Patented Apr. 11, 1893.
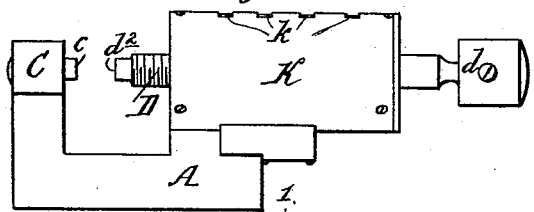
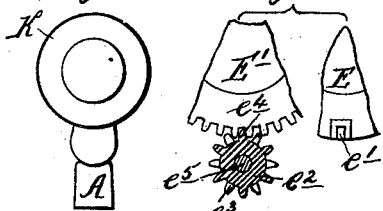
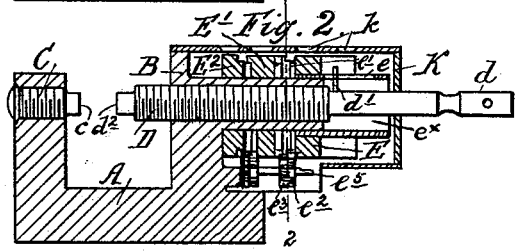
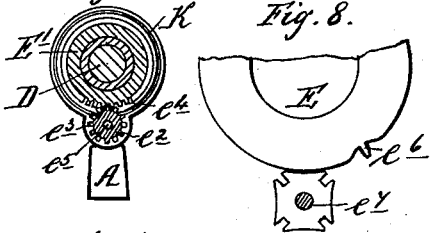
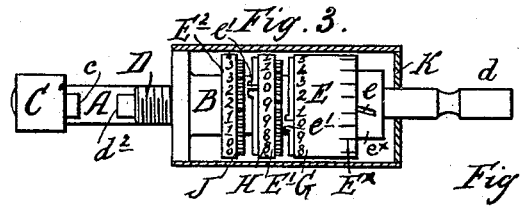
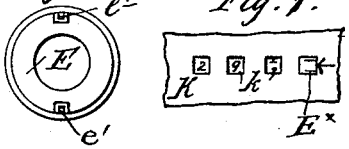
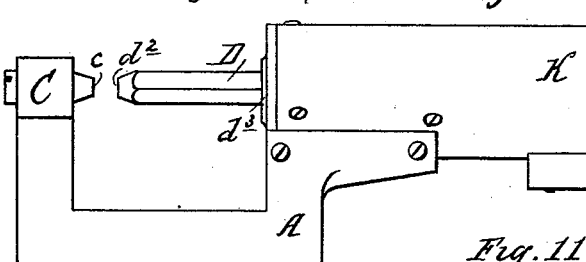
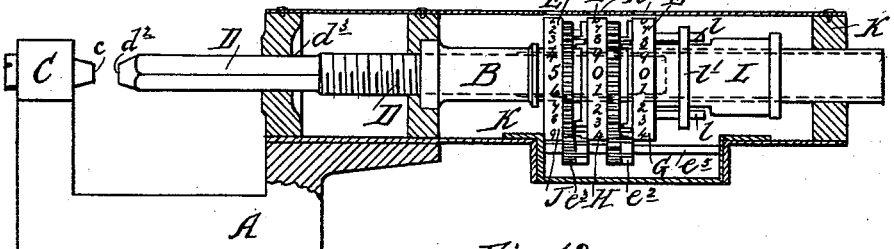
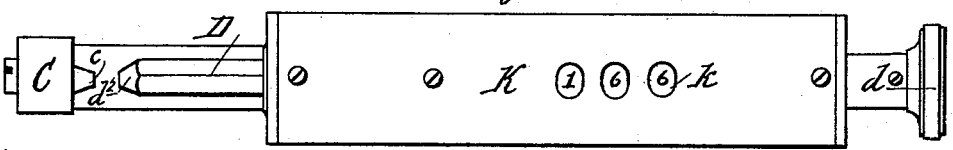
Witnesses:
Inventor:
John C. Smith (Model.)
2 Sheets—Sheet 2.
J. C. SMITH.
MICROMETER GAGE.
No. 495,379. Patented Apr. 11, 1893.
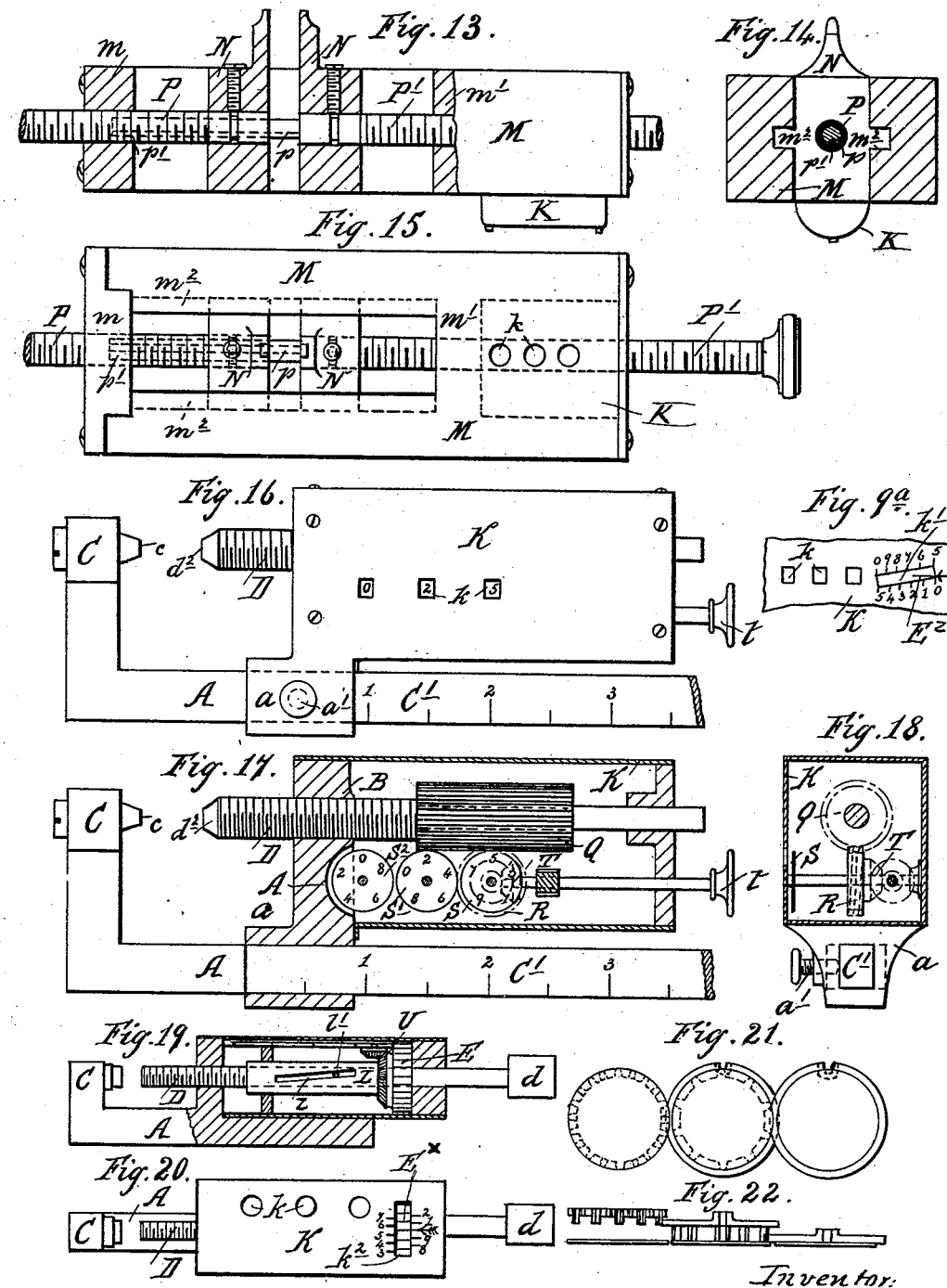
Witnesses:
Stella Dick
F. B. Keifer
Inventor:
John C. Smith
by Marcellus Bailey
his attorney.

UNITED STATES PATENT OFFICE.

JOHN CICERI SMITH, OF EDINBURGH, SCOTLAND.

MICROMETER-GAGE.

SPECIFICATION forming part of Letters Patent No. 495,379, dated April 11, 1893.

Application filed December 8, 1891. Serial No. 414,420. (Model.) Patented in England October 22, 1890, No. 16,856, and in France October 20, 1891, No. 216,850.

*To all whom it may concern:*

Be it known that I, JOHN CICERI SMITH, wire-cloth manufacturer, of 219 High Street, Edinburgh, in the county of Mid-Lothian, Scotland, have invented Improvements in or Relating to Micrometer-Gages, (for which I have obtained Letters Patent in Great Britain, No. 16,856, dated October 22, 1890, and in France, No. 216,850, dated October 20, 1891,) of which the following is a specification.

This invention has reference to micrometer gages for gaging wire, rods, plates and other articles.

With these gages as at present made it is very difficult to see what is the gage or thickness of the article that has been gaged in the instrument because the indications or scales are so small and indistinct, particularly in what is known as the decimal gage which measures to the thousandth of an inch, and therefore the object of my said invention is to make these gages readable by combining therewith or adding thereto any suitable counter which is connected with the micrometer screw or other moving part of the instrument in such a manner that the said counter is worked by the movement of the screw or other part when the instrument is manipulated, and which when being manipulated so as to reduce the gage works the counter backward, and when manipulated so as to increase the gage works the counter forward.

This invention may also be applied on a larger scale for measuring lengths and diameters of spindles, inside of bushes, and any other parts of machinery requiring very accurate measurement for fitting purposes. One advantage is the simplicity of tranferring these measurements to paper for the purpose of transmitting orders by post, and as this may be adjusted to the metric as well as the British standard the advantage would be considerable from an international standpoint.

In the drawings,—Figures 1 to 5 inclusive are respectively, elevation; sectional elevation; sectional plan; end elevation, and cross section taken on line 1, 2 of Fig. 2, and Figs. 6, 7, 8, 9 and $9^a$, detail views of methods in which the counter is moved by the screw. Figs. 10, 11 and 12 are respectively, elevation; sectional elevation and plan of another method in which the counter is moved by the nut. Figs. 13, 14 and 15 are respectively an elevation partly in section, cross section and plan of another method in which the counter is moved by the screw. Figs. 16, 17 and 18 are respectively an elevation, sectional elevation and sectional end elevation of another method in which the counter is actuated by the screw. Figs. 19 and 20 are respectively a sectional elevation and plan of another method in which the counter is actuated by the screw, and Figs. 21 and 22 are respectively an elevation and plan of a detail in the counter driving mechanism.

As shown in Figs. 1 to 5 of the drawings the gage is composed of a frame A, which carries the female screw or nut B, and shoulder or stop pin C. Inside the nut B, I mount a fine threaded screw D, preferably having fifty threads to the inch, and provided at its outer end with a head $d$ by which the screw may be turned. The said screw D has mounted near its one end a pin $d'$ shown in Fig. 2 which gives the movement to the counter by means of the said pin passing through a slot $e$, in a hub or sleeve $e^x$ formed with or secured to the first wheel E of the counter which is mounted loosely on the outside of the nut B. It is provided around its periphery with a circle of lines $E^x$ preferably twenty in number, which indicate fractions, and with a circle of figures G arranged in two sets running from 0 to 9, and again from 0 to 9, which indicate thousandths. The said wheel E on being revolved one half turn gives the next wheel E' of the counter a movement of one space. The means for communicating motion from the first counter wheel E to the second counter wheel E' consist of the spurs $e'$, $e'$, projecting from the end of the wheel E,—Figs. 2, 3 and 6,—which spurs are adapted to engage with the teeth of the pinion $e^3$ which is formed in one with the spur pinion $e^3$, (Figs. 2, 5, and 7) which gears into a spur wheel $e^4$, provided on the wheel E', the said pinions being mounted loosely on a stationary stud or spindle $e^5$. The second counter wheel E' is also provided around its periphery with a circle of figures H arranged in two sets of ten each so as to indicate hundredths while the tenths are indicated by the single set of figures J, provided around the one half of the periphery of the next counter wheel E², which derives its motion from the wheel E' by spurs, half leaf pinion, spur pinion and wheel as before described and as is shown more particularly in Fig. 7. Or if desired as is shown in Fig. 8, I may provide the counter wheels E and E' with suitable fingers or projections $e^6$, so as to engage at the proper time with a star wheel $e^7$, having any desired number of teeth or notches, connected to or in one with the spur pinion, $e^3$, the said star wheel being formed with its edges concave. The said instrument, that is, the working parts, are all inclosed within an outer case or shell K, which is provided with openings $k$, through which the figures may be read. The whole arrangement is such that supposing an article is required to be gaged, it is placed between the stop pin's face $c$, and the screw face $d^2$, and the screw manipulated so as to gage same, the figures would be easily read through the openings $k$ in their proper order, an example of which is shown in Fig. 9, namely the figures 2, 9 and half of 2 and 1 which would read .2915 of an inch.

In lieu of actuating the counter from the screw D, I may actuate it from the female screw or nut, as is shown in Figs. 10, 11 and 12, in which case the said female screw or nut B revolves while the main screw has a rectilinear motion and is kept from revolving by means of its one end being formed square so as to work in a square hole $d^3$, provided in the front of the case or shell K. The counter in this instance is driven by means of the two studs or pins $l$, which project from the first counter wheel E engaging with the ring $l'$, of the sleeve, L, which is fixed to the outside of the nut B. The example shown is constructed to show tens, hundreds and thousands only and as in Fig. 12 would read .166 of an inch.

In order to obviate the necessity of making the screws D of such a fine pitch as fifty threads per inch I may substitute therefore any suitable kind of differential screw mechanism or I may form the said screw in two parts, each of which are of different pitches, as is shown in Figs. 13 to 15 inclusive of the drawings; the said gage being constructed as follows.—M is an oblong or other frame having two female screws or nuts $m, m'$, and two grooves or slots $m^2$, formed in or attached to it, the said grooves $m^2$, being for the purpose of guiding the movable gage head pieces N, which may be formed as shown, that is so that they may gage the inside of tubes and such like as well as other solid articles. Inside each of the said nuts $m, m'$, I mount a screw the one marked P being constructed with twenty-five threads per inch and screw P' with twenty threads per inch, and the inner ends of both connected to the head pieces N in such a manner as to enable the said screws P and P' to revolve; the said frame M is also provided with a shell or casing K for inclosing the counter and also with openings $k$ through which the letters or numbers on the counter's wheels may be read, the said counter is driven by the screw P', in which case the wheels would only have single sets of figures up to ten. The action of said instrument being that supposing screw P', has been revolved twenty times or traveled one inch screw P also has revolved twenty times or traveled four-fifths of an inch, owing to the said screws being connected to each other by means of the slotted end $p$, of the screw P', engaging with and working in the interior of the screw rod P, which is also provided with a key or square ridge $p'$ which works in the grooved end $p$ of screw P thus enabling both screws being revolved together, so that for an inch of travel given to the screw P', the opening between the head pieces N would only be one-fifth of an inch, or equal to a screw of one hundred threads per inch, and if the periphery of the counter is divided into ten it would equal a screw of one thousand threads per inch.

As a further modification of the means for driving the counter I may in lieu of any of the foregoing arrangements employ the driving mechanism shown in Figs. 16, 17 and 18 inclusive in which I combine with or form in one with the main screw D a rod or wire pinion Q which engages with a worm screw R of such a pitch as to require being revolved thirty times to make the main screw and pinion revolve once; the said main screw is pitched at thirty three and one-third pitches per inch and the worm screw is provided with a disk or dial S having ten figures on its face somewhat after the style of a gas meter, the said dial is also connected or geared with other two or three counters $s'$ and $s^2$ arranged at its left hand side, by means of the hereinbefore mentioned mechanism shown in Figs. 1 to 9 though preferably by the mechanism shown in Fig. 8 which would cause the figures to be shown suddenly, and as the said showing of the figures on the worm screw dial S would be very slow, it might be provided with a suitable speeding arrangement. This modification is such that on a milled head $t$, being turned by the operator it actuates the worm screw R through the medium of bevel gearing T and so causes the main screw D to be actuated, and so shows on the counter's dial tenths, hundredths, and thousandths of an inch and if desired ten-thousandths and so be very suitable for measuring parts of machinery and other articles where very fine measurements are required.

In order that each figure of the said counters may not appear gradually so that sometimes only part of it is visible, I may combine with the said counter some movement preferably the finger and star movement used in connection with some watches or the half leaf movement as shown in Figs. 2, 3, 6 and 7, or what is known as the flirt movement shown in Figs. 21 and 22 and also in connection with some watches so as to cause the figures being held back and then released so as to appear in full at once. In order to facilitate the reading of ten-thousandths parts or millimeters I may form the outer case of said gages with an angle slot $k'$ as shown in Fig. 9ª and arrange the figures in the order shown so that on the lines $E^2$ of which there are ten, coming in the center either end will point to a 0 or zero, or if not in the center to the corresponding number on whichever side of the slot $k'$ it should be.

When using the flirt movement Figs. 21 and 22 for driving the dials of the counter I arrange them as shown in Figs. 19 and 20 that is I mount them above the screw D which drives them by means of the revolving sleeve L and slot and pin $l, l'$, and bevel gearing V. One of the said bevel wheels is connected direct to the wheel and circle of lines E which shows the ten-thousandths and the other to the first or one-thousandths dial. Though if desired I may provide suitable intermediate spur gearing from the horizontal bevel wheel to the first dial. The said example also shows a modification of the ten-thousandths reading slot $k^2$ which is formed somewhat after the vernier principle, that is by dividing the periphery of the wheel E into twenty equal parts and taking eighteen of same and redividing them into twenty so as to obtain the lines on the outside of the slot $k^2$ and arranging them intermediate to each other as shown.

My said invention also relates to means for enabling the said gages being used for large sized articles as well as small and which is illustrated in Figs. 16, 17 and 18 that is I form the shoulder part C of the frame A with a tail piece or extension C' which slides in a boss $a$ of the main frame A and in which it may be retained at any desired point by means of a set screw $a'$; the said extension C' may be made any desired length and provided with scale as shown.

The said micrometer gages may also if desired be provided with any well known screw speeding arrangement or automatic wear compensating and back lash nut arrangement or any suitable locking device so as to form a solid or fixed gage and they may be so formed as to be capable of calipering either solid or hollow articles such as rods, wires or tubes.

I claim—

1. The combination of a micrometer gage, having a screw by which the distance between the gaging surfaces is varied, an automatic counting and indicating device, operated from such screw of the gage, and arranged in line therewith and a casing or shell K surrounding the operating mechanism of the gage and the counter, and indicating device substantially as set forth.

2. The combination of a micrometer gage having a screw by which the distance between the gaging surfaces is varied, and a series of counting and indicating wheels mounted loosely, and encircling the said screw, and means whereby the said wheels are actuated from the screw, substantially as set forth.

3. The combination of a micrometer gage having a screw by which the distance between the gaging surfaces is varied, and a series of counting and indicating wheels mounted loosely, and encircling the said screw, and means whereby the said wheels are actuated from the screw, and a perforated casing surrounding the said screw and indicating wheels through which the marks on the wheels may be seen, substantially as set forth.

4. The combination of a micrometer gage having a screw by which the distance between the gaging surfaces may be varied, a series of counting and indicating wheels arranged around the said screw, one of the said wheels, E, being connected so as to turn with the said screw, and the others being loose relative thereto, and means for transmitting motion from the wheel E to the other indicating wheels, substantially as set forth.

5. The combination of a micrometer gage having a screw by which the distance between the gaging surfaces may be varied, carrying the pin $d'$, the counting and indicating wheel E having the hub or sleeve $e^x$ in which is the slot $e$ through which the said pin $d'$ projects, the indicating wheel E' and $E^2$ loosely surrounding the screw, and the transfer gearing between the said indicating wheels, substantially as set forth.

6. The combination of a micrometer gage having a screw by which the distance between the gaging surfaces is varied, the automatic counting and indicating device connected with the said screw so as to be operated thereby, one of the wheels being provided with a series of numbers G and with a scale or series of marks $E^x$, and the casing surrounding the operating parts of the gage and the counting and indicating device, provided with openings opposite to the indicating wheel, and with a slot having a scale marked along its edges arranged opposite the said scale or series of marks $E^x$, substantially as set forth.

In testimony whereof I have signed my name to this specification in the presence of two subscribing witnesses.

JOHN CICERI SMITH.

Witnesses:
 EDMOND BROWN,
*Clerk, 22 St. Leonard's Hill, Edinburgh.*
 JOHN JELLY,
*Clerk, 42 Home St., Edinburgh.*